(12) United States Patent
Pinder et al.

(10) Patent No.: US 10,353,840 B2
(45) Date of Patent: Jul. 16, 2019

(54) SECURE DIGITAL FORMAT CARD HAVING TWO INTERFACES TO COMMUNICATE WITH TWO PROCESSORS

(71) Applicant: MOTOROLA SOLUTIONS, INC., Chicago, IL (US)

(72) Inventors: Ellis A. Pinder, Davie, FL (US); Juan J. Giol, Davie, FL (US); Matthew E. Simms, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/822,703

(22) Filed: Nov. 27, 2017

(65) Prior Publication Data
US 2019/0163659 A1  May 30, 2019

(51) Int. Cl.
| G06F 13/38 | (2006.01) |
| G06F 13/42 | (2006.01) |
| G06F 21/57 | (2013.01) |
| G06F 13/40 | (2006.01) |
| G06K 7/00 | (2006.01) |
| G06K 19/077 | (2006.01) |

(52) U.S. Cl.
CPC ........ *G06F 13/387* (2013.01); *G06F 13/4022* (2013.01); *G06F 13/4265* (2013.01); *G06F 21/575* (2013.01); *G06K 7/0021* (2013.01); *G06F 13/385* (2013.01); *G06F 2213/3852* (2013.01); *G06K 19/07732* (2013.01)

(58) Field of Classification Search
None
See application file for complete search history.

(56) References Cited

U.S. PATENT DOCUMENTS

| 7,069,369 | B2 | 6/2006 | Chou et al. | |
| 8,301,822 | B2 | 10/2012 | Pinto et al. | |
| 2005/0197017 | A1* | 9/2005 | Chou | G06F 13/385 |
| | | | | 439/660 |
| 2005/0230483 | A1* | 10/2005 | Miller | G06K 19/077 |
| | | | | 235/492 |
| 2007/0233907 | A1* | 10/2007 | Yoshikawa | G06F 13/387 |
| | | | | 710/26 |
| 2009/0044260 | A1* | 2/2009 | Niglio | H04L 63/0428 |
| | | | | 726/9 |
| 2014/0298222 | A1* | 10/2014 | Kiss | G06F 9/454 |
| | | | | 715/765 |
| 2014/0334097 | A1* | 11/2014 | Thill | G06K 19/0701 |
| | | | | 361/679.55 |
| 2015/0052266 | A1 | 2/2015 | Hershko et al. | |
| 2017/0023966 | A1* | 1/2017 | Kim | G05F 3/245 |

* cited by examiner

*Primary Examiner* — Scott C Sun
(74) *Attorney, Agent, or Firm* — Perry + Currier, Inc.

(57) ABSTRACT

A secure digital format card that includes two interfaces to a processor is provided, comprising a housing, and a processor that includes a secure digital input/output (SDIO) interface, a second interface, and further connections different from the interfaces. A first set and second set of pads are located at the housing, a subset of the first set for communicating with the processor via the SDIO interface. A subset of the second set for communicating with the processor via the second interface, and a further subset of the second set for communicating with the processor via the further connections. The processor is configured to: enable the subset of the second set of pads via the second interface when enable data is received via the one or more further connections, from the further subset of the second set of pads.

15 Claims, 10 Drawing Sheets

| HOST DEVICE | PAD 10Y: RESET/ BOOT_SEL2 (PULLED UP) | PAD13Y: KEYLOAD/ BOOT_SEL1 (PULLED UP) | RESET LOGIC CIRCUIT OUTPUT AT CONNECTION 236 (PAD 10y) + NOT (PAD 13y) | BOOT MODE AT CONNECTIONS 233,235 (PAD 10y, PAD 13y) | ENABLE/DISABLE SECOND INTERFACE 222 PAD10y/ CONNECTION 230 | DESCRIPTION |
|---|---|---|---|---|---|---|
| COTS UHS-II SOCKET | 0 | 0 | 0,1 ⇒ 1 OUT OF RESET | BOOT FROM MEMORY 256 | DISABLE (HIGH-Z) | PADS 10Y, 13Y GROUNDED; BOOT FROM MEMORY 256 |
| DEVICE 103 (DEVICE 101 IN RESET) | 0 | 1 | 0,0 ⇒ 0 IN RESET | NONE | DISABLE (HIGH-Z) | HOST DEVICE 103 PLACES DEVICE 103 IN RESET (NO BOOT) |
| DEVICE 103 PROGRAMMING DEVICE 101 OUT OF RESET | 1 | 0 | 1,1 ⇒ 1 OUT OF RESET | FORCE SERIAL DOWNLOAD | ENABLE (LOW-Z) | HOST DEVICE 103 PLACES DEVICE 103 OUT OF RESET; BOOT FROM DATA FROM DEVICE 101 |
| COTS SD LEGACY SOCKET | 1 | 1 | 1,0 ⇒ 1 OUT OF RESET | BOOT FROM MEMORY 256 | ENABLE (LOW-Z) | DEVICE 103 AUTOMATICALLY OUT OF RESET; BOOT FROM MEMORY 256 |

FIG. 4

SECURE DIGITAL FORMAT CARD HAVING TWO INTERFACES TO COMMUNICATE WITH TWO PROCESSORS

BACKGROUND

Secure digital format cards are generally used to expand a memory of a host device. However, cards having such secure digital formats may be used for other functions and host devices may be adapted for use therewith. Adapting such cards for use with legacy host devices may be important to ensure that damage does not occur to either the card or the legacy host device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 depicts logic states received at a processor of the secure digital format card, and resulting functionality, in accordance with some embodiments.

Figure 1:
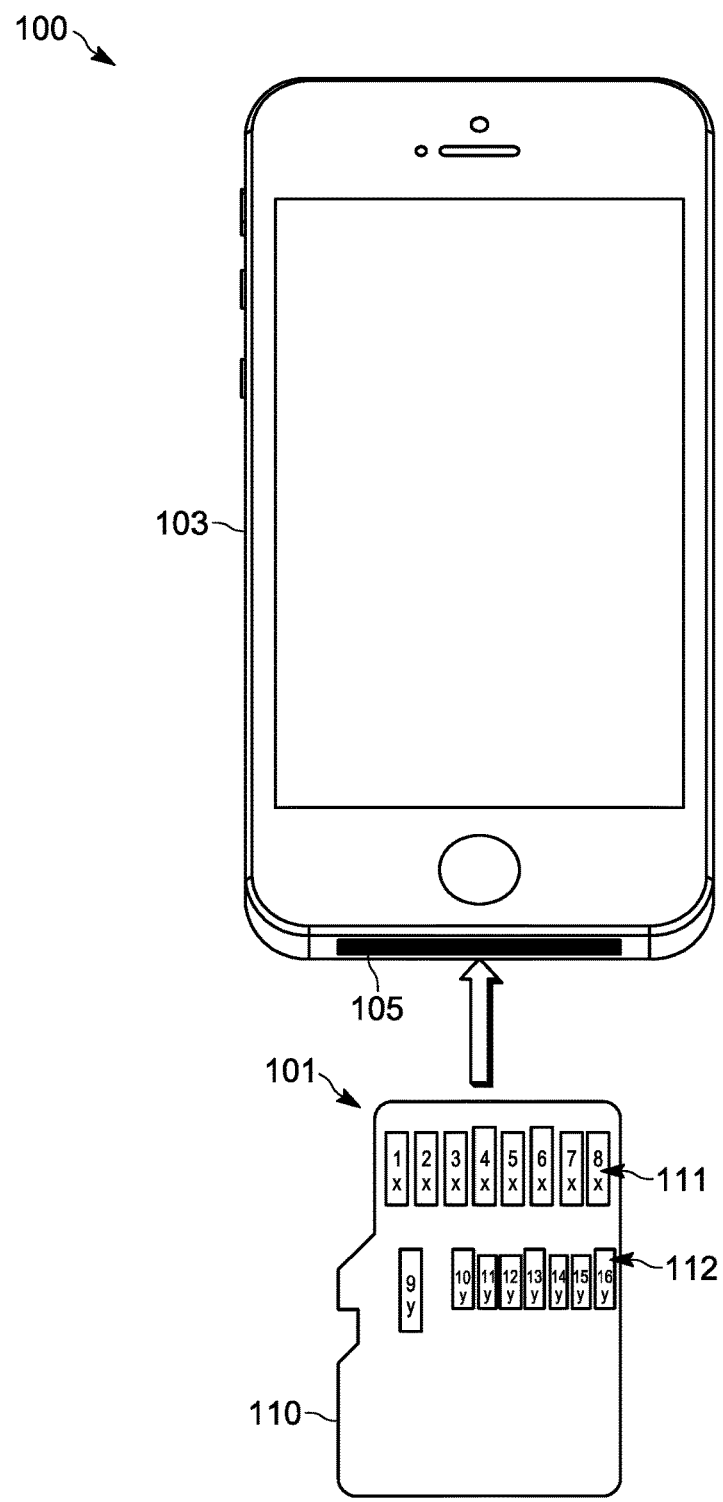
FIG. 1 is a system that includes a secure digital format card that includes two interfaces to a processor, and a host device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Secure digital (SD) format memory cards, including mini-SD memory cards and micro-SD memory cards, are generally used to expand a memory of a device. However, cards having secure digital formats may be used for other functions other than expanding a memory. For example, a security processor may be integrated into such an SD card format, which performs cryptographic encoding and decoding using stored cryptographic keys, for example for communications of a radio of a host device adapted for use with such a security processor. The SD card is inserted into an SD socket of the host device and, assuming the SD card uses a secure digital input/output (SDIO) interface to the secure processor, the device may communicate with the secure processor at the SD card using existing SD communications protocols, for example to save data in a memory as per legacy SD-format memory cards. However, limiting such an SD card to SDIO interfaces can make connections to multiple processors in a host device challenging. For example, other processors in a host device may be configured to communicate using other types of interfaces, such other types of processors used to expand the functionality of the host device; for example, in radios, such other types of processors may be used to enhance security, telemetry and emergency responses, as well as assist with receiving detailed data. Hence, provided herein is an SD card-type device that includes a processor that is capable of communicating with different external processors at a host device into which the SD card-type device is inserted, using two interfaces. Furthermore, the SD card-type device may be inserted into a legacy host device (e.g. a host device that supports an SD memory card, but not the present SD card-type device having the expanded functionality) without damaging the legacy host device or the present SD card-type device.

Provided herein is device comprising: a housing having a secure digital (SD) card format; a processor within the housing; a secure digital input/output (SDIO) interface to the processor; a second interface to the processor, the second interface of a different type than the SDIO interface; one or more further connections to the processor, the one or more further connections different from the SDIO interface and the second interface; a first set of pads at the housing, a subset of the first set of pads for communicating with the processor via the SDIO interface; and a second set of pads at the housing, a subset of the second set of pads for communicating with the processor via the second interface, and a further subset of the second set of pads for communicating with the processor via the one or more further connections, the processor configured to: enable the subset of the second set of pads to communicate with the processor via the second interface when enable data is received via the one or more further connections, from the further subset of the second set of pads.

Attention is first directed to FIG. 1 which depicts a schematic diagram of a system 100 that includes a device 101 comprising an SD card-type device and a host device 103 that includes a socket 105 (e.g. an SD card-type socket), and the like, which accepts the device 101. The system 100 of FIG. 1 is not drawn to scale, and illustrates that the host device 103 accepts the device 101 therein via the socket 105.

The device 101 includes a housing 110 having a secure digital (SD) card format; for example, as depicted the housing 110 is in a micro-SD card format, however in other embodiments, the housing 110 may be in a larger SD card format, including a UHS (Ultra-High-Speed)-I format, and/or a mini-SD card format. Generally, the socket 105 is compatible with the format of the housing 110 and configured to accept the housing 110 therein. Furthermore, while the socket 105 is depicted as being at an external surface of the host device 103, the socket 105 may be located internal to the host device 103 and accessible via a removable panel, and the like.

The device 101 further comprises a first set of pads 111 at the housing 110, for example arranged in a first row, and a second set of pads 112 at the housing 110, for example arranged in a second row. As depicted, the first set of pads 111 include eight pads 1x, 2x, 3x, 4x, 5x, 6x, 7x, 8x, and the second set of pads 112 include eight pads 9y, 10y, 11y, 12y, 13y, 14y, 15y, 16y. Hence, for clarity, the present specification will use a convention of labeling pads in the first set of pads 111 as "#x", where "#" is a pad number and "x" indicates a pad in the first set of pads 111; similarly, the present specification will use a convention of labeling pads in the second set of pads 112 as "#y", where "#" is a pad number and "y" indicates a pad in the second set of pads 112.

Each of the first set of pads 111 and the second set of pads 112 are electrically conducing and provide an electrical interface with the device 101. Furthermore, while the term "pads" is used herein, the pads may alternatively be referred to as pins, electrical connections, and the like.

As depicted, the first set of pads 111 and the second set of pads 112 are arranged in a UHS-II SD-format. Similarly, it is assumed that the socket 105 has a physical format which accepts UHS-II SD-format cards, however, as described below, a host device and/or the socket into which the device 101 is inserted may or may not include corresponding pins, and the like, which mate with all of first set of pads 111 and the second set of pads 112. In general, a host device, including legacy host devices, and/or a socket includes pins, and the like, that mate and/or electrically connect with the first set of pads 111, but may not include pins that mate with the second set of pads 112. The provided host device 103 and/or the socket 105, as described below, includes pins, and the like, which mate with the first set of pads 111, to communicate with a first processor of the host device 103, and pins, and the like, which mate with the second set of pads 112 to communicate with a second processor of the host device 103.

Figure 2:
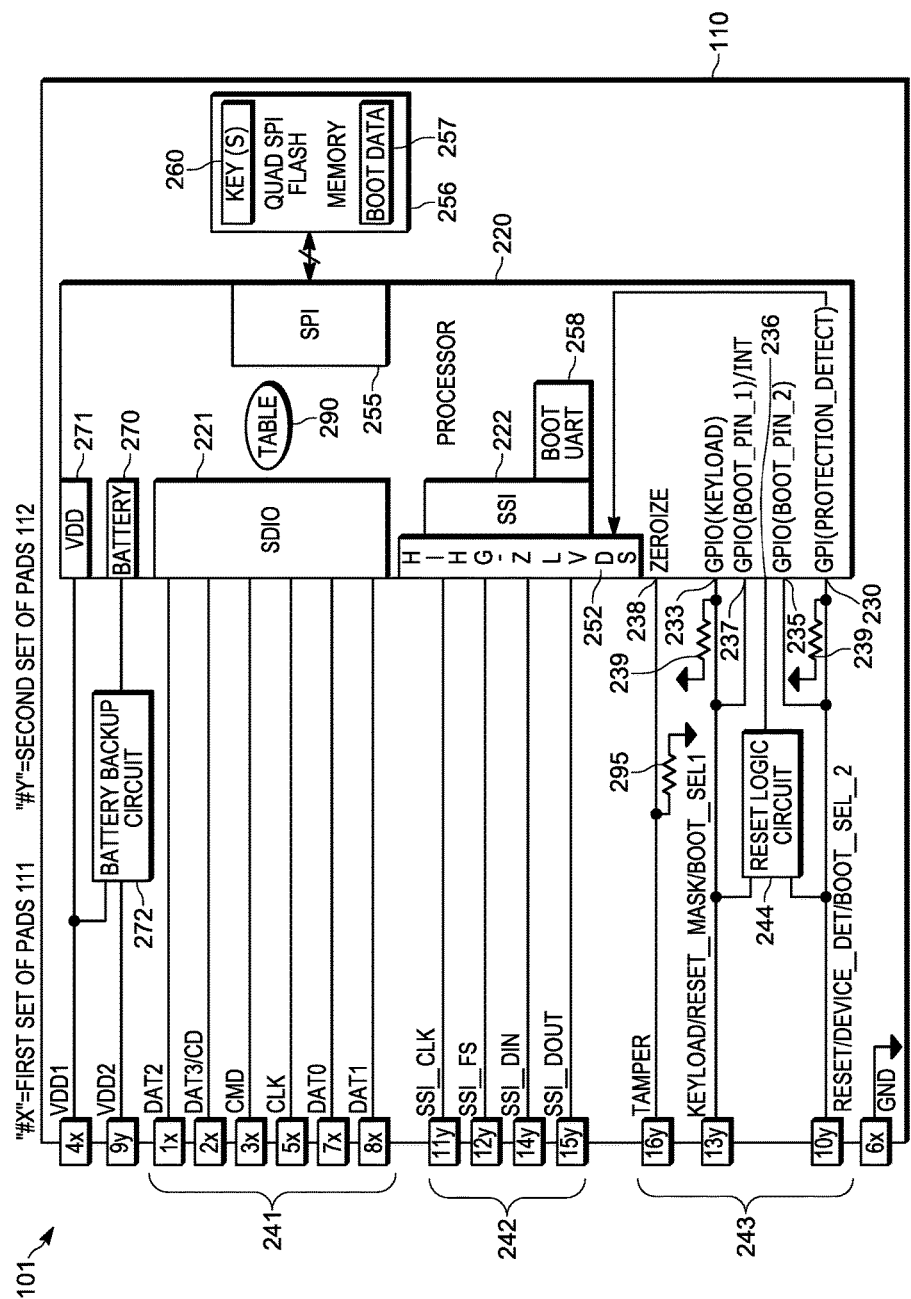
FIG. 2 is a block diagram of the secure digital format card of FIG. 1 in accordance with some embodiments.

Attention is next directed to FIG. 2 which depicts a block diagram of the device 101. In particular, the device 101 includes: a processor 220 within the housing 110; a secure digital input/output (SDIO) interface 221 to the processor 220; and a second interface 222 to the processor 220, the second interface 222 of a different type than the SDIO interface 221. For example, as described herein the second interface 222 may comprise a synchronous serial interface (SSI) and/or a serial interface.

In particular, the SDIO interface 221 is specific for use with SD cards; hence, for an SD compatible processor at the host device 103 to access the processor 220 via the SDIO interface 221, the host device 103 would include a complementary SDIO interface. However, not all processors at the host device 103 may be configured for use with SDIO interfaces; hence the second interface 222, as provided, is not specific for use with SD cards and may be used as a more specific type of interface to the processor 220. Hence, for example, the second interface 222 may comprise a synchronous serial interface (SSI) and/or a serial interface which may be more commonly used than SDIO interfaces. The second interface 222 may include other types of serial interfaces including, but not limited to a serial peripheral interface (SPI), an inter-integrated circuit (I2C) interface, an inter-IC (I2S) interface, a universal asynchronous receiver-transmitter (UART) interface, and the like.

Nonetheless, the device 101 may be used with a legacy SD host device configured for use with SD memory cards, UHS-I SD-format memory cards UHS-II SD-format memory cards, and the like. While some legacy host devices configured for use with SD memory cards do not include pins for accessing the second set of pads 112, legacy host devices configured for use with UHS-II SD include pins for accessing the second set of pads 112. The device 101 is hence configured for use with such legacy host devices to ensure that damage does not occur to either a legacy host device and/or the device 101, when the device 101 is inserted into a legacy host device. Furthermore, as will be described below, each set of pads 111, 112 may be used by the host device 103, by themselves (e.g. independent of one another) and/or together.

For example, the device 101 further includes one or more further connections 230, 233, 235, 236, 237, 238 to the processor 220. The one or more further connections 230, 233, 235, 236, 237, 238 are different from the SDIO interface 221 and the second interface 222. The one or more further connections 230, 233, 235, 236, 237, 238 may be used by the processor 220 to receive data from a host device (e.g. the host device 103) indicative of a type of host device into which the device 101 is inserted, and/or indicative of how the device 101 is to function with the host device. The processor 220 may responsively enable or disable the second interface 222, as described below. As well, the processor 220 may responsively, one or more of, determine: whether to place the processor 220 in reset or out-of-rest, a boot mode of the processor 220; whether or not to delete cryptographic keys; and the like.

FIG. 2 further depicts the first set of pads 111 (e.g. pads 1x, 2x, 3x, 4x, 5x, 6x, 7x, 8x) and the second set of pads 112 (e.g. pads 9y, 10y, 11y, 12y, 13y, 14y, 15y), as well as electrical connections between the pads 111, 112 and the processor 220, for example electrical traces, wires, and the like depicts as lines between the pads 111, 112 and the processor 220.

In particular, a subset 241 of the first set of pads 111 (in the depicted example. pads 1x, 2x, 3x, 5x, 7x, 8x) are electrically connected to the SDIO interface 221 and are for communicating with the processor 220 via the SDIO interface 221. For example, an SD-compatible processor at the host device 103 may communicate with the processor 220 via the SDIO interface 221 via the subset 241 of the first set of pads 111.

Similarly, a subset 242 of the second set of pads 112 (in the depicted example. pads 11y, 12y, 14y, 15y) are electrically connected to the second interface 222 and are for communicating with the processor 220 via the second interface 222. For example, a processor at the host device 103 (for example a serial interface compatible processor and/or an SSI compatible processor) compatible with the second interface 222, may communicate with the processor 220 via the second interface 222 via the subset 242 of the second set of pads 112.

A further subset 243 of the second set of pads 112 (in the depicted example. pads 10y, 13y, 16y) are connected to the processor 220 via, connections 230, 233, 235, 236, 237, 238. In particular, the further subset 243 of the second set of pads 112 is for communicating with the processor 220 via the one or more further connections 230, 233, 235, 236, 237, 238 independent of either the SDIO interface 221 or the second interface 222.

As depicted the connections 230, 235 connects the processor 220 with the pad 10y of the second set of pads 112, the connections 233, 237 connects the processor 220 with the pad 13y of the second set of pads 112, the connection 236 connects the processor 220 with the pads 10y, 13y of the second set of pads 112 via a reset logic circuit 244, and the connection 238 connects the processor 220 with the pad 16y of the second set of pads 112. In some embodiments, the connection 238 is optional.

The further subset 243 of the second set of pads 112 may be used by the processor 220 to receive data indicative of a type of host device into which the device 101 has been inserted (and/or indicative of how the device 101 is to function with the host device), and enable or disable the second interface 222 accordingly.

The processor 220 includes one or more logic circuits, one or more processors, one or more microprocessors, one or more ASIC (application-specific integrated circuits) and one or more FPGA (field-programmable gate arrays) and the like configured to implement the functionality of the device 101. In particular, the processor 220 is configured to: enable the subset 242 of the second set of pads 112 to communicate with the processor 220 via the second interface 222 when enable data is received via the one or more further connections 230, 233, from the further subset 243 of the second set of pads 112. Otherwise, communications between the subset 242 of the second set of pads 112 and the second interface 222 are disabled.

For example, the processor 220 may receive enable data from the host device 103, when the device 101 is inserted into the socket 105, and responsively enable the subset 242 of the second set of pads 112 to communicate with the processor 220 via the second interface 222.

Similarly, the processor 220 is further configured to refrain from enabling the subset 242 of the second set of pads 112 to communicate with the processor 220 via the second interface 222 when disable data is received via the one or more further connections 230, 233, from the further subset 243 of the second set of pads 112. Such receipt of disable data may include an absence of a receipt of enable data.

As will be described below, the enable data and the disable data, may each comprise a set of logic states which correspond to a relatively "high" logic level, such as "1", or a relatively "low" logic level, such as "0". Indeed, the logic state described in examples herein may generally be binary values.

For example, the data received at the processor 220 from the further subset 243 of the second set of pads 112 may indicate a "0" or a "1" for each of the pads 10y, 13y. As described herein, whether or not to enable or disable the subset 242 of the second set of pads 112 to communicate with the processor 220 via the second interface 222 may depend on data received, for example, via the pad 10y, and specifically whether the logic state indicated by the data received via the pad 10y indicates a "0" or a "1".

For example, as depicted, an enabling/disabling circuit 252 is located at the second interface 222, the enabling/disabling circuit 252 configured to open and close connections between the subset 242 of the second set of pads 112 and the second interface 222 depending, for example, on data received over the further subset 243 of the second set of pads 112, and specifically pad 10y in the depicted example, as described in more detail below.

In particular, the enabling/disabling circuit 252 may comprise a High-Z (where "Z" is impedance) LVDS (low voltage differential signaling) circuit, where the impedance may be controlled to: an enable value (e.g. a relative low Z value) where the subset 242 of the second set of pads 112 is in communication with the second interface 222 (e.g. the subset 242 of the second set of pads 112 being enabled); and a disable value (e.g. a relative high Z value) where the subset 242 of the second set of pads 112 is not in communication with the second interface 222 (e.g. the subset 242 of the second set of pads 112 being disabled). The enabling/disabling circuit 252 may be referred to as a "High-Z LVDS" circuit as the signals received at the processor 220 over the second set of pads 112, when enabled, may in some embodiments comprise low voltage differential signals.

In some embodiments, the enabling/disabling circuit 252 may comprise a plurality of switches, and the like, one switch for each of the subset 242 of the second set of pads 112, which are closed in an enable and/or low-Z state, and open in a disable and/or high-Z state.

In some embodiments, the enabling/disabling circuit 252 may be supplied with the processor 220, as some processors with serial interfaces are preconfigured with such enabling/disabling circuits (e.g. the enabling/disabling circuit 252 may be a component of the processor 220). However, in other embodiments the enabling/disabling circuit 252 may be a separate component from the processor 220.

As depicted, the connection 230 is in communication with the enabling/disabling circuit 252 via the processor 220, and the impedance of the enabling/disabling circuit 252 may be changed between the enable value and the disable value depending on the data received over the further subset 243 of the second set of pads 112. The connection 230 is labelled "GPI (Protection_Detect)" indicating that the connection 230 may be used as a "general purpose input" (GPI) for indicating whether the second interface 222 is to be enabled or disabled (e.g. a detection of whether the second interface 222 is to be not protected or protected from an external device, such as the host device 103).

Furthermore, the pads 10y, 13y of the further subset 243 of the second set of pads 112 are electrically coupled to pull-up resistors 239, which generally sets a default "high" logic level (e.g. "1" or a "pulled-up" logic level), and the like, to the corresponding connections 230, 233, 235, 237. Such a default "high" logic level value at each of the connections 230, 233, 235, 237 enables the processor 220 to determine when it is inserted into a legacy SD host device in which there is no connection to the second set of pads 112. For example, when the processor 220 reads "1" at one or more of the connections 230, 235 and further reads "1" at one or more of the connections 233, 237, the processor 220 can determine how to function when inserted at a host device that is an SD legacy host device that does not connect to second interface 222. The processor 220 may, in some embodiments, when the processor 220 reads "1" at each of the connections 230, 237, enable the second interface 222 as there is no connection thereto and no damage may occur to either the legacy SD host device that does not connect to the second set of pads 112, nor may any damage occur to the device 101. However, in some embodiments, whether to enable or disable the second interface 222 may depend only on the processor 220 reading "1" at the connection 230, as described in more detail below.

The "high" logic state of such pull-up resistors 239 may also be read by a host device, which enables the host device to determine that the device 101 is a non-standard SD device (e.g. not a standard SD memory card). Put another way, the pull-up resistors 239 enable a "non-standard" external SD host to determine that the device 101 is a non-standard SD device.

However, when the device 101 is inserted into a legacy host device that connects to the second set of pads 112, for example, a UHS-II memory card compatible host device, the legacy SD host device generally grounds the pads 10$y$, 13$y$, which sets a "low" logic level of "0", and the like, at the pads 10$y$, 13$y$. Such a "low" logic level value at least at each of the connections 230, 237 enables the processor 220 to determine when it is inserted into a legacy SD host device which connects to the second set of pads 112, and the processor 220 may disable the second interface 222 accordingly, to prevent damage to either the legacy SD host device or the device 101.

In other words, when the device 101 is inserted into a socket of a "standard" SD host (e.g. a host device which is configured for use with an SD memory card connects to the second set of pads 112, such a UHS-II memory card), the standard SD host device may merely connect the pads 10$y$, 13$y$ to ground. For example, at SD UHS-II memory cards, the pads corresponding to the pads 10$y$, 13$y$ are merely used for grounding and do not include pull-up resistors, and hence such pads so not indicate a logic level.

Put another way, the further subset 243 of the second set of pads 112 comprises pads that are designated as ground pads according to a UHS-II (ultra-high-speed-II) SD-format; and the further subset 243 of the second set of pads 112, that are that are designated as ground pads according to the UHS-II SD-format, are electrically coupled to the pull-up resistors 239 to enable the processor 220 to determine that it is coupled to a non-standard SD device.

As depicted, the device 101 further comprises the reset logic circuit 244 in communication with the further subset 243 of the second set of pads 112, and specifically pads 10$y$, 13$y$. The reset logic circuit 244 is generally configured to provide an indication of whether the processor 220 is be in an out-of-reset mode or a reset mode, for example when the device 101 is powered up. As depicted, the reset logic circuit 244 is connected to the connection 236. In the out-of-rest mode, the processor 220 may boot up. Hence the indication received from the reset logic circuit 244 at the processor 220 (e.g. at the connection 236) may be referred to as a boot signal (which may be alternatively referred to as a reset signal). The boot signal is generally based on boot mode data (which may be alternatively referred to as reset mode data) received over the further subset 243 of the second set of pads 112, and specifically the pads 10$y$, 13$y$.

For example, the reset logic circuit 244 may receive boot mode data (e.g. a combination of "0" or "1" for each of the pads 10$y$, 13$y$) from the host device 103 via the pads 10$y$, 13$y$, when the device 101 is inserted into the socket 105, and responsively provide a boot signal and/or a reset signal to the processor 220, via the connection 236, indicative of whether the processor 220 is to boot and/or be placed in an out-of-reset mode. Alternatively, the boot mode data may indicate that the processor 220 is not to boot and/or be placed in a reset mode.

The boot mode data received over the connections 235, 237 may be further indicative of how a reboot is to occur. For example, as depicted the processor 220 is connected to a serial port interface (SPI) 255 which connect to a memory 256 which may store boot data 257 which may be used by the processor 220 to boot up (e.g. when out-of-reset). As depicted, the memory 256 comprises a quad SPI (Serial Peripheral Interface) flash memory, however the memory 256 may comprise any type of memory compatible with the processor 220 and/or the device 101.

As described in more detail below, in some embodiments, the boot mode data received over the connections 235, 237 may indicate that the processor 220 is to boot up and/or be placed in an out-of-reset mode using the boot data 257 stored in the memory 256, for example when a boot is to occur. Alternatively, in some embodiments, the boot mode data received over the connections 235, 237 may indicate that the processor 220 is to boot up using boot data received from an external host device, via the subset 242 of the second set of pads 112, for example via a boot UART (universal asynchronous receiver-transmitter) 258 component of the processor 220, the boot UART 258 in communication with the second interface 222; such an embodiment assumes that the subset 242 of the second set of pads 112 has been enabled such that the processor 220 and the subset 242 of the second set of pads 112 are communicating via the second interface 222.

Indeed, in some embodiments, the processor 220 may be further configured to: receive boot mode data via the one or more further connections 235, 237, from the further subset 243 of the second set of pads 112; when the boot mode data indicates a memory boot, boot from the boot data 257 stored in the memory 256; and, when the boot mode data indicates a download boot, boot from boot data received over the second interface 222. Like the enable data and the disable data, the boot mode data may comprise a set of logic states.

Alternatively, the processor 220 may be further configured to: receive boot mode data via the one or more further connections 235, 237, from the further subset 243 of the second set of pads 112; when the boot mode data indicates a memory boot, boot from the boot data 257 stored in the memory 256; and, when the boot mode data indicates that no boot is to occur, refrain from booting and/or be in reset.

Such a determination of whether the processor 220 is in an out-of-reset mode or in a reset mode may be determined using the reset logic circuit 244. For example, the reset logic circuit 244 (in communication with the further subset 243 of the second set of pads 112) is generally configured to provide a reset logic signal and/or a boot signal (e.g. at the connection 236) to the processor 220 based on reset mode data and/or boot mode data received over the further subset 243 of the second set of pads 112.

The processor 220 may determine how to boot (e.g. whether to boot from the memory 256 or from boot date received from an external host device) may be determined based on the combination of the logic states of the pads 10$y$, 13$y$ received at the connections 235, 237 as described below.

For example, as depicted, the processor 220 stores a table 290 which relates the various logic states received at the connections 230, 233, 235, 237 to functionality of the processor 220, for example when the processor 220 is first powered on. Indeed, the table 290 may comprise, and/or be a component of, machine-readable instructions executable at the processor 220. Furthermore, while the table 290 is described herein as being stored at the processor 220, the table 290, and the like, may be stored at the memory 256 and retrieved by the processor 220, for example when the processor 220 is powered up. In other words, functionality of the processor 220, based on the data received at the connections 233, 235, may be hard-coded into a boot pin decoder (described below with respect to FIG. 3) and/or the processor 220, and/or may be based on machine-readable instructions stored in the memory 256. The data in the table 290 may be provided in a format other than a table.

In the depicted example, the memory 256 alternatively stores one or more cryptographic keys 260. Furthermore, in the depicted example, one pad 16y (also labelled "TAMPER") of the further subset 243 of the second set of pads 112, is for receiving (e.g. from a host device) tamper data indicative of whether to erase or not erase the one or more cryptographic keys 260. In these embodiments, the processor 220 is further configured to: erase the one or more cryptographic keys 260 when the tamper data is indicative of erasing the one or more cryptographic keys 260, as described in further detail below. For example, the tamper data may indicate a logic state of "1" or "0", and the like, with "1" indicating that the one or more cryptographic keys 260 are to be deleted and "0" indicating that the one or more cryptographic keys 260 are not to be deleted. Furthermore, the connection 238 is in communication with a pull-down resistor 295 located between the pad 16y and the connection 233, which provides a default logic state of "0", and the like (e.g. a low logic state), at the connection 233 to protect the one or more cryptographic keys 260 from being deleted until tamper data indicating a logic state of "1" is received via the pad 16y, e.g. from the host device 103.

The connection 238 is also labelled "zeroize" as the process of erasing the one or more cryptographic keys 260 may alternatively be referred to as "zeroizing". New one or more cryptographic keys, that replace the erased one or more cryptographic keys 260, may be received over the connection 233 (and hence the connection 233 is labelled "GPIO (KEYLOAD)" for "general purpose input/output"). While such new cryptographic keys may also be received at the connection 237, they are generally ignored by the processor 220.

As depicted, the device 101 and/or the processor 220 further comprises a back-up power connection 270 (in the depicted example, integrated with the processor 220 and labelled "Battery"), as well as a power connection 271 (also labelled "VDD", e.g. a positive power connection (and/or drain supply) for the processor 220). Each of the power connection 270 and the power connection 271 are connected to a pad from each of the first set of pads 111 (e.g. pad 4x) and the second set of pads 112 (e.g. pad 9y); hence, the device 101 and/or the processor 220 may be powered from power received over the first set of pads 111 and/or the second set of pads 112. For example, the power connections 270, 271 may receive power from a power supply of the host device 103 over the pad 4x when the host device 103 is on, while the back-up power connection 270 may receive power from a battery of the host device 103 over the pad 9y, when the host device 103 is off. Indeed, the back-up power connection 270 may supply power to a random access memory (e.g. the memory 256) of the device 101, and receipt of power from a battery while the host device 103 is off may prevent the cryptographic keys 260 from being erased while the device 101 is inserted in the host device 103, Furthermore, as depicted, each of the power connection 270 and the power connection 271 are connected to a "battery" backup circuit 272 which is used to control whether the back-up power connection 270 is receiving power over the pad 4x (e.g. when power is being supplied to the pad 4x), or from the pad 9y (e.g. when power is not being supplied to the pad 4x). Such a backup circuit 272 may ensure that the back-up power connection 270 receives power from a battery of the host device 103 only when the host device 103 is off to ensure that the back-up power connection 270 does not drain the battery.

In some embodiments, the voltage of the power received at each of the pads 4x, 9y may be different, and the battery backup circuit 272 may hence be compatible with each of the voltages.

As depicted, in FIG. 2, each of the first set of pads 111 and the second set of pads 112 is further labelled according to a function of the pads 111, 112 when both the SDIO interface 221 is in use, and the second interface 222 is in use as an SSI, for example when the device 101 is inserted into a host device, such as the host device 103.

For example, the first set of pads 111 are generally used for SD card functionality compatible with the SDIO interface 221. In particular, pads 7x, 8x, 1x, 2x are respectively used to exchange SD serial data DAT0, DAT1, DAT2, DAT3 with a host device according to a secure digital card standard, with pad 2x optionally used for card detection ("CD") by the host device. Pad 3x is used for SD commands/responses ("CMD") between the device 101 and the host device via the SDIO interface 221. Pad 4x is used to receive VDD-type power ("VDD1" or voltage drain supply 1 from a host device, which may be 1.8V or 3.3 V in example embodiments). Pad 5x is used to receive clock data ("CLK") from a host device. Pad 6x is used for a ground connection ("GND").

Similarly, pads 11y, 12y, 14y, 15y of the second set of pads 112 are generally labelled according to SSI functionality, used when the second interface 222 comprises an SSI in particular example embodiments. Hence, pad 11y is used to receive SSI clock data ("SSI_CLK") from a host device, pad 12y is used to exchange SSI frame synchronization data ("SSI_FS") with a host device, pad 14y is used to receive SSI data ("SSI_DIN" or SSI data-in) from a host device, and pad 15y is used to transmit SSI data ("SSI_DOUT" or SSI data-out) to a host device.

Pads 10y, 13y are labelled according to the respective data they receive from an external host device. For example, data received at the pad 10y may indicate whether or not the device 101 is to in reset or is to be in out of reset, for device detection, and for boot mode selection (e.g. in combination with data received from the pad 13y) and hence is labeled "RESET/DEVICE_DET/BOOT_SEL_2". Data received at the pad 13y may indicate that the pad 13y may be used for keyloading (e.g. for transmission of new cryptographic keys to the processor 220), whether or not the device 101 is to reset, for boot mode selection (e.g. in combination with data received from the pad 10y) and hence is labeled "KEYLOAD/RESET_MASK/BOOT_SEL_1".

Figure 3:
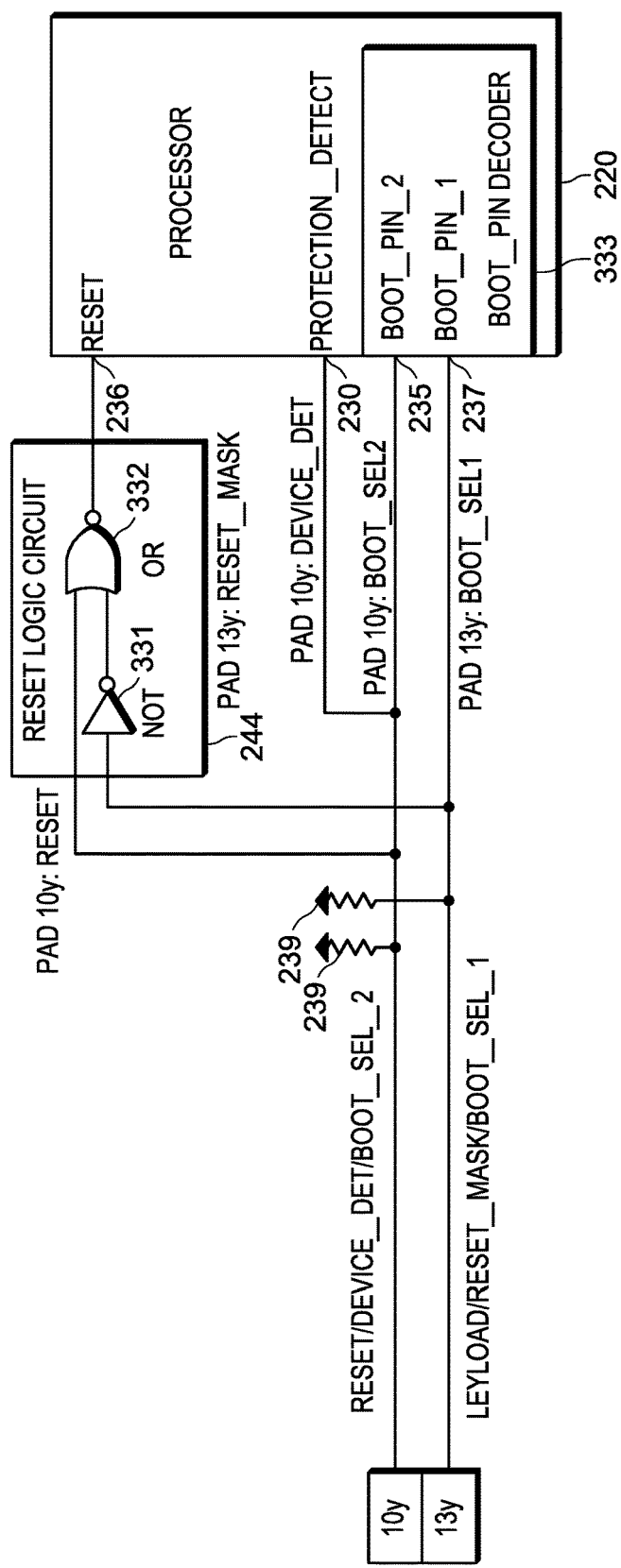
FIG. 3 depicts detail of the block diagram of FIG. 2 in accordance with some embodiments.

Attention is next directed to FIG. 3 which depicts the reset logic circuit 244, as well as the pads 10y, 13y, and connections 230, 235, 237, 236 to the processor 220.

As depicted, the reset logic circuit 244 comprises a NOT logic circuit 331 connected to the pad 13y, and an OR logic circuit 332 connected to the pad 10y and the NOT logic circuit 332. The OR logic circuit 332 further outputs a boot signal (alternatively referred to as a reset signal) to the connection 236 of the processor 220. Hence, when boot data received at the pads 10y, 13y indicates a logic state of "1" at the pad 10y or a logic state of "0" at the pad 13y (e.g. "1" after the NOT logic circuit 332), a boot signal indicating a logic state of "1" occurs at the connection 236. Furthermore, the pull-up resistors 239 provide a default logic state of "1" at each of the pads 10y, 13y, as "read" by the reset logic circuit 244.

Furthermore, as also depicted in FIG. 1, the processor 220 comprises a boot pin decoder 333 which receives data via the connections 233, 235 (e.g. from the pads 10y, 13y, respectively) and determines how a boot up is to occur, as described hereafter.

Attention is next directed to FIG. 4 which depicts an example of the table 290. While the table 290 is provided in rows and columns, with a header row, the data and/or logic in table 290 may be provided in any suitable format including being hardcoded at the processor 220. The first row of the table 290 is a header row; the second row of the table 290 indicates logic states read at the connections 230, 233, 235, 237 by the processor 220 when the device 101 is inserted into a host device that includes a COTS (commercial off-the-shelf) UHS-II socket; the third row of the table 290 indicates logic states read at the connections 230, 233, 235, 237 by the processor 220 when the device 101 is inserted into the host device 103, assuming the host device 103 has been configured to place the device 101 into reset; the fourth row of the table 290 indicates logic states read at the connections 230, 233, 235, 237 by the processor 220 when the device 101 is inserted into the host device 103, assuming the host device 103 has been configured to place the device 101 out of reset and to control the device 101 to boot from boot data downloaded to the device 101 from the host device; the fifth row of the table 290 indicates logic states read at the connections 230, 233, 235, 237 by the processor 220 when the device 101 is inserted into a host device that includes a COTS legacy SD socket (i.e. that does not connect to the second set of pads 112), for example a UHS-I socket.

The first column of the table 290 indicates a host device into which the host device 103 is inserted; the second column of the table 290 (labelled "PAD 10y") indicates a resulting logic state received at the connections 230, 235 (e.g. from the pad 10y, and/or using the associated pull-up resistor 239); the third column of the table 290 (labelled "PAD 13y") indicates a resulting logic state received at the connection 233, 237 (e.g. from the pad 13y, and/or using the associated pull-up resistor 239); the fourth column of the table 290 (labelled "reset logic circuit") indicates the pair of logic states received at the OR logic circuit 332 and the resulting output of the OR logic circuit 332 (e.g. following the respective arrow), as well as an indication of the resulting reset mode of the processor 220; the fifth column of the table 290 (labelled "Boot Mode") indicates the boot mode to be implemented at the processor 220 based on the pair of logic states received at the connections 233, 235 from the pads 10y, 13y; the sixth column of the table 290 (labelled "Enable/Disable") indicates whether the second interface 222 is to be enabled or disables based on the logic state received at the connection 230 from the pad 10y, for example, by controlling the enabling/disabling circuit 252 to low-Z (enable) or high-Z (disable) impedance values; the seventh column of the table 290 is merely provided as an annotation to describe of the behavior of the device 101 in each of the host devices indicated in the first column.

In particular, the table 290 indicates in the second row that, when the host device 103 is inserted into a host device having a COTS UHS-II legacy socket, a set of logic states of "0, 0" will be read by the processor 220 from the pads 10y, 13y, for example as the COTS UHS-II legacy socket grounds each of the pads 10y, 13y. As a result, with reference to the fourth column, the reset logic circuit 244 outputs a reset signal and/or a boot signal of "1" to the connection 236 and, in response, the processor 220 is placed "out of reset". With reference to the fifth column, a set of logic states of "0,0" read by the processor 220 at the connections 233, 235 indicate that the processor 220 is to boot from the boot data 257 from the memory 256. Furthermore, with reference to the sixth column, a logic state of "0" at the connection 230 indicates that the second interface 222 is to be disabled, and consequently the processor 220 controls the enabling/disabling circuit 252 to high-Z impedance values.

The table 290 indicates in the fifth (e.g. the last) row that, when the device 103 is inserted into a host device having a COTS SD legacy socket, a set of logic states of "1, 1" will be read by the processor 220 from the pads 10y, 13y, for example due to the pull-up resistors 239, as such an SD legacy socket does not connect with the second set of pads 112. As a result, with reference to the fourth column, the reset logic circuit 244 outputs a reset signal and/or a boot signal of "1" to the connection 236 and, in response, the processor 220 is placed "out of reset". With reference to the fifth column, a set of logic states of "1, 1" read by the processor 220 at the connections 233, 235 indicate that the processor 220 is to boot from the boot data 257 from the memory 256. Furthermore, with reference to the sixth column, a logic state of "1" at the connection 230 indicates that the second interface 222 is to be enabled, and consequently the processor 220 controls the enabling/disabling circuit 252 to low-Z impedance values.

The table 290 indicates in the third row that, when the host device 103 is inserted into the host device 103 configured to place the processor 220 in reset, the host device 103 outputs a set of logic states of "0, 1" respectively, to the pads 10y, 13y. As a result, the reset logic circuit 244 outputs a reset signal and/or a boot signal of "0" to the connection 238 and, in response, the processor 220 is placed in reset and/or held in reset. With reference to the fifth column, the set of logic states "0, 1", read by the processor 220 at the connections 233, 235, indicate that the processor 220 is not to boot (e.g. as the processor 220 is being held in reset and/or in a reset mode). Furthermore, with reference to the sixth column, a logic state of "0" at the connection 230 indicates that the second interface 222 is to be disabled, and consequently the processor 220 controls the enabling/disabling circuit 252 to high-Z impedance values.

The table 290 indicates in the fourth row that, when the host device 103 is inserted into the host device 103 configured to place the processor 220 in an out-of-reset mode and further to control the device 101 to boot from data provide by the host device 103, the host device 103 outputs a set logic states of "1, 0" respectively to the pads 10y, 13y. As a result, the reset logic circuit 244 outputs a reset signal and/or a boot signal of "1" to the connection 236 and, in response, the processor 220 is placed in an out-of-reset mode. With reference to the fifth column, a set of logic states "1, 0" is read by the processor 220 at the connections 233, 235, which indicate that the processor 220 is to boot from data provide by the host device 103. Furthermore, with reference to the sixth column, a logic state of "1" at the connection 230 indicates that the second interface 222 is to be enabled, and consequently the processor 220 controls the enabling/disabling circuit 252 to low-Z impedance values.

Figure 5:
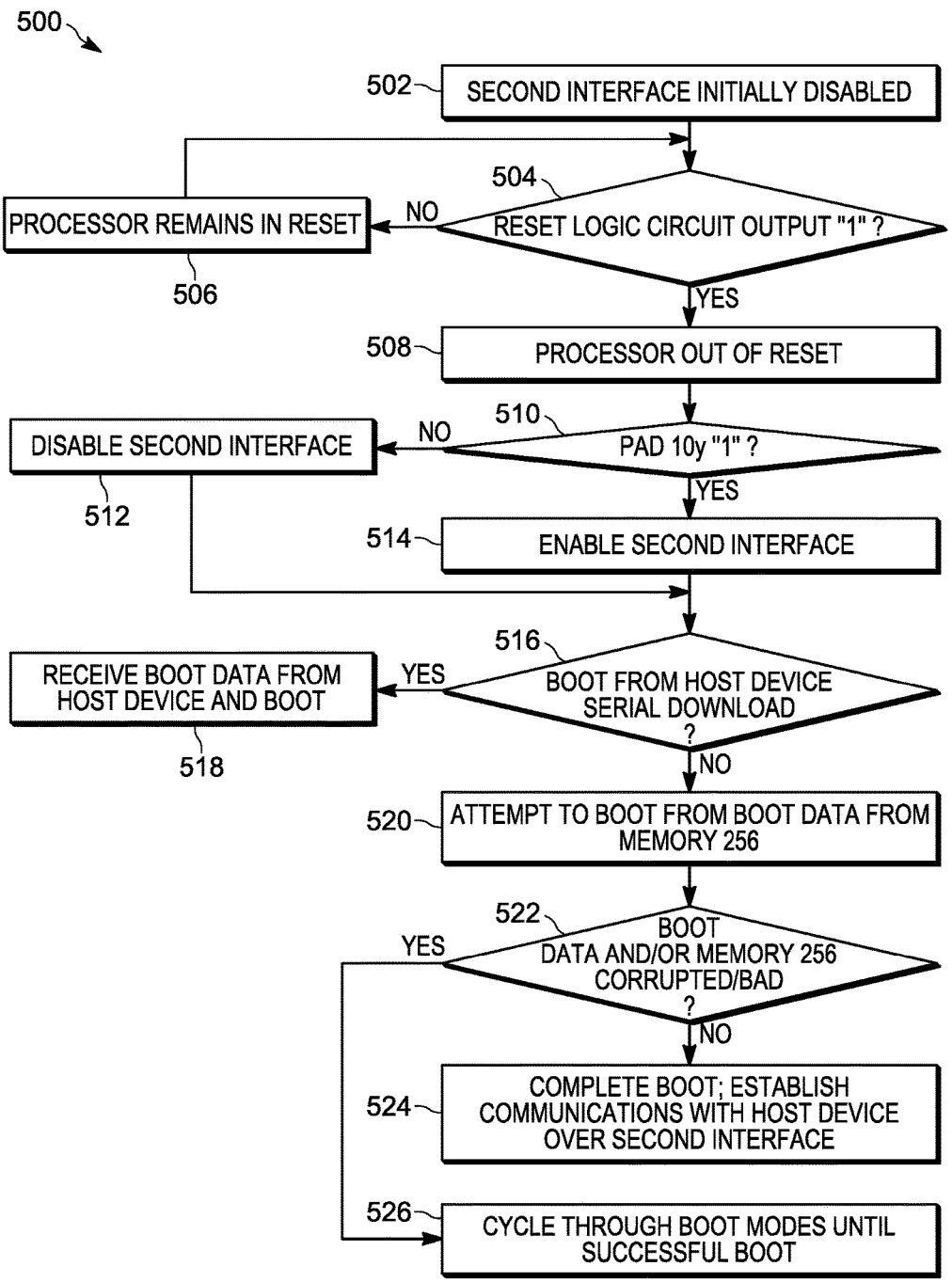
FIG. 5 is a flowchart of a method for enabling or disabling a second interface to the processor of the secure digital format card, and for controlling a reset mode and boot mode thereof in accordance with some embodiments.

Attention is now directed to FIG. 5 which depicts a flowchart representative of a method 500 for enabling or disabling a second interface to the processor of the device 101, and for controlling a reset mode and boot mode thereof. In some embodiments, the operations of the method 500 of FIG. 5 correspond to machine readable instructions that are executed by, for example, the processor 220. In the illustrated example, the instructions represented by the blocks of FIG. 5 may be at least partially represented by the table 290 (. The method 500 of FIG. 1 is one way in which the device 101 and/or the processor 220 and/or the system 100 is configured. Furthermore, the following discussion of the method 500 of FIG. 5 will lead to a further understanding of the device 101 and/or the system 100.

However, it is to be understood that the device 101 and/or the processor 220 and/or the method 500 and/or the system 100 may be varied, and need not work exactly as discussed herein in conjunction with each other, and that such variations are within the scope of present embodiments.

Furthermore, the method 500 of FIG. 5 need not be performed in the exact sequence as shown and likewise various blocks may be performed in parallel rather than in sequence. Accordingly, the elements of method 500 are referred to herein as "blocks" rather than "steps".

At a block 502, the processor 220 powers up, for example when power is initially provided to the power connection 271, for example when the device 101 is inserted into a host device.

At a block 504, the processor 220 determines whether the reset logic circuit 244 is outputting data and/or a boot signal corresponding to a logic state of "1" (e.g. a high logic state) or a logic state of "0" (e.g. a low logic state) to the connection 236.

When a "0" is received at the connection 236 (e.g. a "NO" decision at the block 504), at the block 506, the processor 220 remains in reset and/or in a reset mode. Such a decision is analogous to the third row of the table 290 in which the device 101 is inserted into the host device 103, and the host device 103 outputs logic states of "0" and "1" to the pads 10y, 13y, respectively.

However, when a "1" is received at the connection 236 (e.g. a "YES" decision at the block 504), at the block 508, the processor 220 is placed in an out-of-reset mode and determines how to boot (e.g. see blocks 516 to blocks 524). Such a decision is analogous to any of the second, firth and fifth rows of the table 290 in which the device 101 is inserted into a host device, and the host device causes a respective set of logic states of "0, 0", "1, 0" or "1, 1" to be read using the pads 10y, 13y.

As such a boot mode may depend on the second interface 222 being enabled, at a block 510, the processor 220 determines the logic state of at the connection 230, for example as received from the pad 10y.

When a logic state of "0" is received at the connection 230 (e.g. a "NO" decision at the block 504), at the block 512, the processor 220 disables the second interface 222 and/or, when the second interface 222 is already disabled, the second interface 222 remains disabled. Such a decision is analogous to the second and third rows of the table 290 in which the device 101 is inserted into a host device, and a logic state of "0" occurs at the pad 10y and/or the corresponding connections to the processor 220.

However, when a logic state of "1" is received at the connection 230 (e.g. a "YES" decision at the block 504), at the block 514, the processor 220 enables the second interface 222. Such a decision is analogous to the fourth and fifth rows of the table 290 in which the device 101 is inserted into a host device, and a logic state of "1" occurs at the pad 10y and/or the corresponding connections to the processor 220.

At the block 516, the processor 220 determines whether to boot using boot data received from the host device 103 (e.g. via a serial download via the second interface 222, when enabled), or whether to boot from the boot data 257 stored in the memory 256. For example, the processor 220 processes the pairs of logic states received at corresponding connections 235, 237 of the pads 10y, 13y (e.g. using the boot pin decoder 333).

When the pairs of logic states received via the pads 10y, 13y indicate a boot is to occur using boot data received from the host device 103 (e.g. the host device 103 outputs the set of logic states "1, 0" to the pads 10y, 13y, respectively), at the block 518 the processor 220 receives boot data from the host device 103 and boots accordingly.

As such, the set of logic states "1, 0" is unique to the three pairs of logic states in which the processor 220 is placed out of reset, the other two pairs (e.g. "0,0" and "1,1") corresponding to the device 101 being placed into a legacy host SD device. Hence the set of logic states "1, 0", is the only set of logic states (of four possible logic states) in which boot data can be received from a host device and in which the second interface 222 is enabled.

When the set of logic states received at the pads 10y, 13y indicate a boot is to occur using the boot data 257 stored at the memory 256, at the block 520 the processor 220 attempts to retrieve the boot data 257 from the memory 256 to boot.

At the block 522, the processor 220 determines whether the boot data and/or the memory 256 is corrupted and/or bad (e.g. a boot cannot be completed using the boot data 257 and/or the boot data 257 cannot be retrieved from the memory 256).

When a "NO" decision occurs at the block 522 (e.g. the boot data 257 from the memory 256 is not corrupted or bad), at the block 524, the boot of the processor 220 completes and the processor 220 established communications with the host device 103 over the second interface 222.

However, when a "YES" decision occurs at the block 522 (e.g. the boot data 257 from the memory 256 is corrupted or bad), at the block 526, the processor 220 cycles through various boot modes, until a successful boot occurs. For example, when the boot data 257 retrieved from the memory 256 does not result in a successful boot, the device 101 may request boot data from the host device, for example over the second interface 222.

Figure 6:
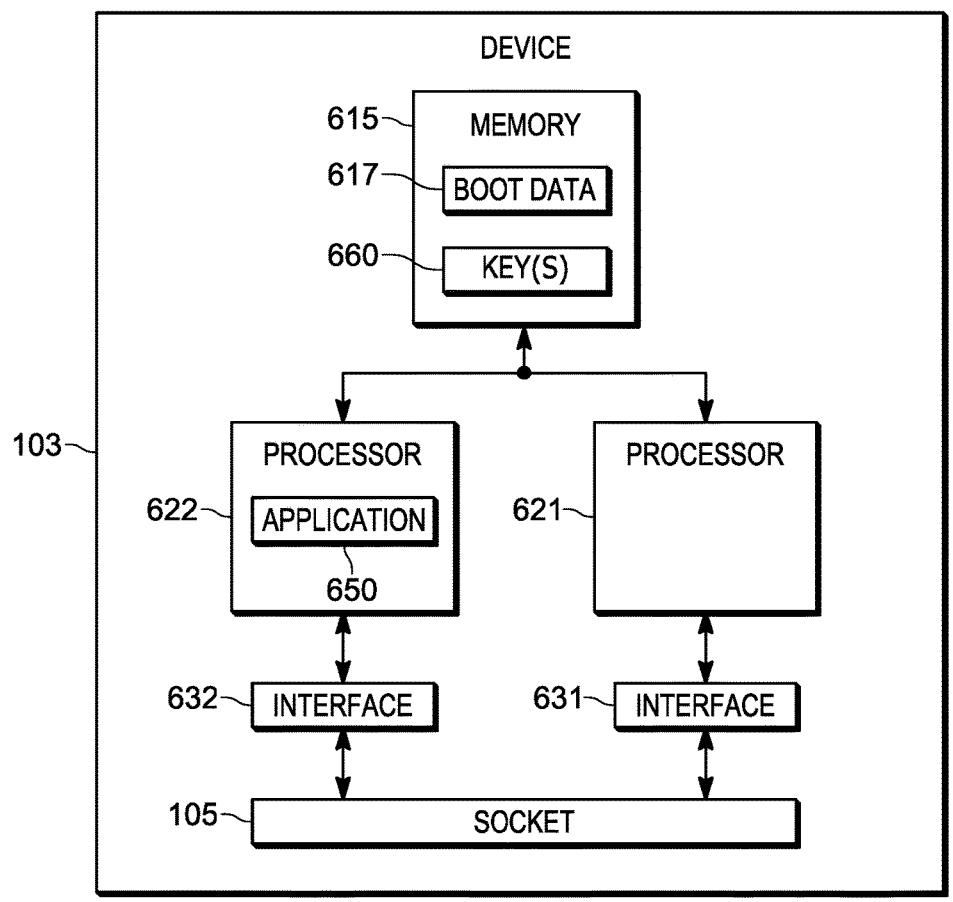
FIG. 6 depicts a block diagram of the host device of the system of FIG. 1 in accordance with some embodiments.

Attention is next directed to FIG. 6 which depicts a block diagram of the host device 103, which includes the socket 105, a memory 615 storing boot data 617, a first processor 621, such as an applications processor configured to communicate using an SD interface, and a second processor 622, such as a security processor, configured to communicate using an interface of a second type, such as a serial interface and/or an SSI. The first processor 621 may be used by the host device 103 to implement general applications the host device 103, while the second processor 622 may be used to implement applications enhanced by the processor 220 at the host device 103. For example, the second processor 622 may transmit data to the processor 220, which encrypts the data using the one or more cryptographic keys 260, and returns encrypted data to the second processor 622.

However, in some embodiments, both processors 621, 622 may independently access and/or make use of the cryptographic functionality of processor 220. In other types of applications, the processors 621, 622 may access other types of functionality of the processor 220 independently and/or in tandem with each other. Hence, the processors 621, 622 may be configured to share functionality of the processor 220 and/or access different respective types of functionality of the processor 220 (e.g. the first processor 621 may access the processor 220 via the first set of pads 111 to perform a first function type (e.g. storing data at the memory 256); and the second processor 622 may access the processor 220 via the second set of pads 112 to perform a second function type (e.g. encrypting data)).

Indeed, while present embodiments are described with respect to the host device 103 using the device 101 for encrypting and decrypting data, the host device 103 may use the device 101 for other types of functionality. For example, the second processor 622 may be a component of an expansion board, and the like, used to expand functionality of the host device 103, for example to add features to the host device 103, such as radio features. The device 101 may interface with the second processor 622 via the second set of pads 112 to provide additional processing resources to the second processor 622 for such radio features.

Hence, the second processor 622 and the device 101 may be used for any suitable functionality and/or the device 101 may be used to provide additional processing resources to the second processor 622 for any suitable functionality, whether or not the second processor 622 is component of an expansion board or not.

Indeed, depending on the functionality of which the device 101 is used, the pad 16y may be used for other types of functions other than those related to cryptographic keys; similarly, the pad 13y could be used to receive other types of data other than cryptographic keys.

Furthermore, each set of pads 111, 112 may be used by themselves (e.g. independent of one another) and/or together.

While not depicted, the host device 103 may further comprise various input devices, communication and/or radio interfaces and the like, as well as one or more power supplies and/or batteries.

The host device 103 further includes respective interfaces 631, 632 to the socket 105. In particular the interface 631 can include connections to pins of the socket 105 which electrically connect to the first set of pads 111, and the interface 632 can include connections to pins of the socket 105 which electrically connect to the second set of pads 112.

As depicted, the host device 103 further includes an application 650 which, as depicted is executed at the second processor 622. The application 650 may comprise machine readable instructions that, when executed by the second processor 622, enables the second processor 622 to output logic states that correspond to enable data, disable data, boot data, tamper data etc., and output such logic states to the second interface 632, for example to the pads 10y, 13y, 16y of the device 101, to control the device 101 when received in the socket 105. However, the application 650 may alternatively be executed at the first processor 621 and the first processor 621 may communicate with the second processor 622 to instruct the second processor 622 to output logic states to the pads 10y, 13y, 16y of the device 101, to control the device 101 when received in the socket 105.

In particular, the second processor 622 may output logic states of "0, 1", respectively, the pads 10y, 13y, when the device 101 is to remain in reset and no boot is to occur, and the second processor 622 may output logic states of "1, 0"", respectively, the pads 10y, 13y, when the device 101 is to be placed out of reset and the boot data 617 is to be transmitted to the device 101 to cause the device 101 to boot using the boot data 617. Whether or not the device 101 is to remain in reset or be placed out of reset and/or whether or not a boot is to occur may depend on the functionality of the host device 103 and/or the functionality that is to be implemented at the device 101 that assists the functionality of the host device 103.

For example, a decision as to whether or not to place the device 101 in or out of reset and/or whether or not a boot may occur at the second processor 622, for example upon a power up of the host device 103 and/or when an error condition is detected at the second processor 622; when an error condition is detected, the second processor 220 may control the device 101 to reboot. Such a decision may alternatively occur at the first processor 621 (e.g. and communicated to the second processor 622), however, in general, such a determination may occur at only one of the processor 621, 622, for example a processor designated as a master of SD device control/reset logic.

As depicted, the memory 615 further stored one or more cryptographic keys 660 which may be used to replace the one or more cryptographic keys 260 at the device 101. For example, the second processor 622 may be further configured to output a logic state to the pad 16y, via the interface 632, which corresponds to tamper data received at the connect 238 of the processor 220 at the device 101. When the logic state is "1", the processor 220 deletes the cryptographic keys 260 and the second processor 622 transmits the one or more cryptographic keys 660 to the device 101 via the pad 13y, for example to the connection 233 which causes the processor 220 to store the one or more cryptographic keys 660 at the memory 256, replacing the one or more cryptographic keys 260. The logic state of "1", corresponding to tamper data indicative erasing the one or more cryptographic keys 260, may occur when a given input is received at the device 101, for example at an input device (not depicted), a multiple button press and/or when a tamper trigger occurs, for example as determined using the application 650 (e.g. when a condition is detected, such as a security breach, and/or a message indicating that the one or more cryptographic keys 260 are to be deleted).

Figure 7:
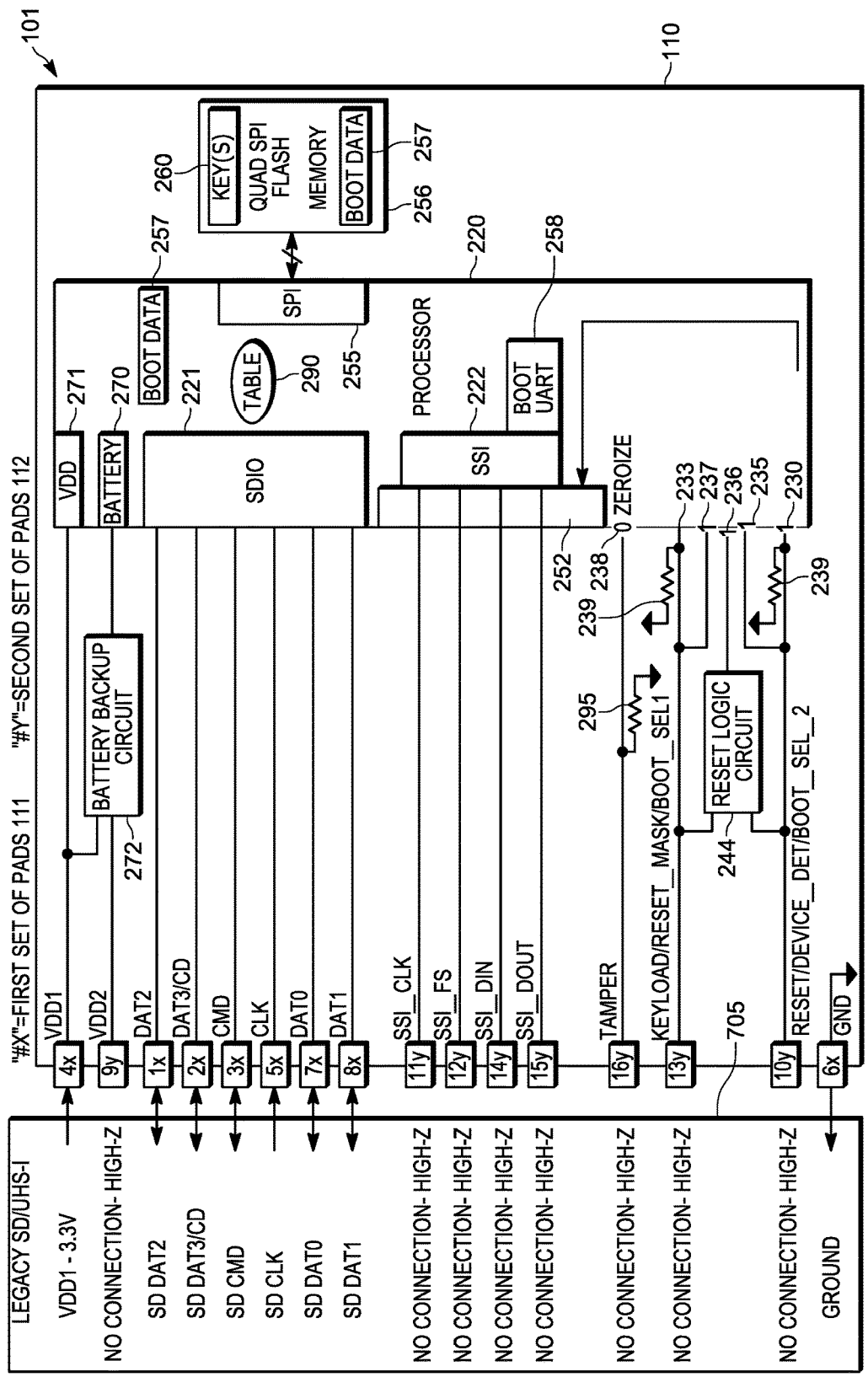
FIG. 7 depicts the secure digital format card in use with a legacy UHS (Ultra-High-Speed)-I socket in accordance with some embodiments.

Attention is next directed to FIG. 7 which schematically depicts the device 101 interfacing with a socket 705 of a legacy SD host device and specifically a legacy SD host device that includes a UHS-I socket. The functionality of each the connections and/or pins of the socket 705 to the respective pads 111, 112 are indicated adjacent each of the pads 111, 112. The provided arrows in the socket 705 further indicate a direction of data/power flow, with most connections and/or pins of the socket 705 being bidirectional, other than the clock data ("SD_CLK"), the ground at the pad 6x, and 3.3 Volt power provided at the pad 4x. As depicted, there is no connection to any of the second set of pads 112. Also depicted in FIG. 7 are the resulting detected logic states and/or enable data and/or boot data and/or tamper data at the connections 230, 235, 236, 237, 238 (respectively "1", "1", "1", "1", "0") via the pads 10y, 13y, 16y, that result from no connection thereto (e.g. due to pull-up resistors 239 and the pull-down resistor 295). As described with respect to the last row of the table 290, such logic states result in the enabling/disabling circuit 252 being enabled: as depicted connections from the pads 11y, 12y, 14y, 15y (e.g. the further subset 242 of the second set of pads 112) are connected to the second interface 222 via the enabling/disabling circuit 252 (e.g. switches in the enabling/disabling circuit 252 are schematically depicted as closed). Furthermore, as depicted, the processor 220 has retrieved the boot data 257 from the memory 256 and is attempting to boot using the boot data 257. Furthermore, as the tamper data is "0", the one or more cryptographic keys 260 are not erased.

Hence, in the configuration depicted in FIG. 7, the device 101 functions as a legacy SD memory card and stores data received over the SDIO interface 221 in the memory 256. Furthermore, no damage occurs to the host device 103 via the second interface 222 being enabled as the socket 705 does not electrically connect thereto.

Figure 8:
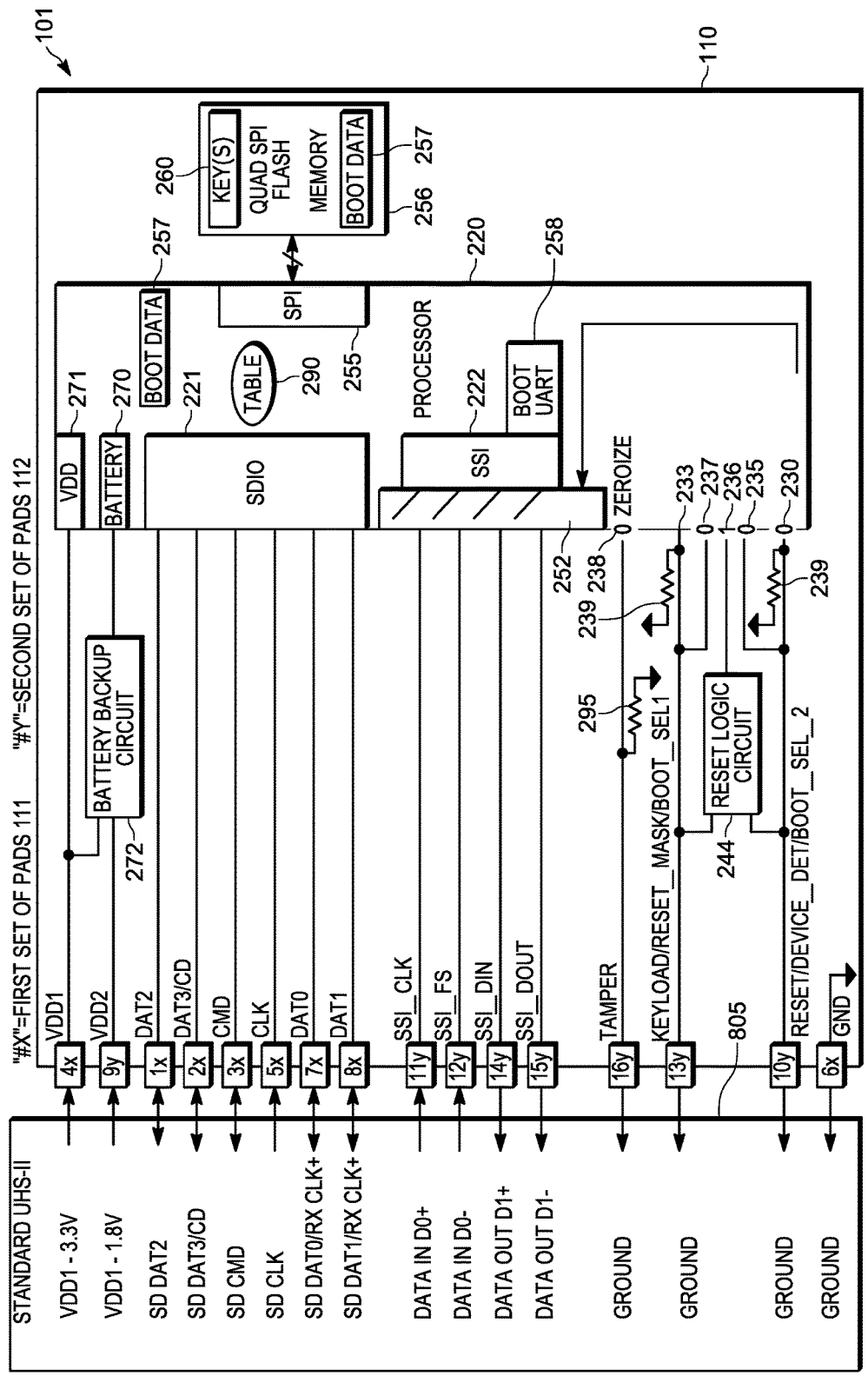
FIG. 8 depicts the secure digital format card in use with a legacy UHS-II socket in accordance with some embodiments.

Attention is next directed to FIG. 8 which schematically depicts the device 101 interfacing with a socket 805 of a legacy SD host device and specifically a legacy SD host device that includes a UHS-II socket. The functionality of each the connections and/or pins of the socket 805 to the respective pads 111, 112 are indicated adjacent each of the pads 111, 112. The provided arrows further indicate a direction of data/power flow as similar to FIG. 7. In particular, power of 3.3 Volts is provided at the pad 4$x$, and power of 1.8 V is provided at the pad 9$y$. The pads 10$y$, 13$y$, 16$y$ are all held at a ground state. Also depicted in FIG. 8 are the resulting detected logic states and/or enable data and/or boot data and/or tamper data at the connections 230, 235, 236, 237, 238 (respectively "0", "0", "1", "0", "0") via the pads 10$y$, 13$y$, 16$y$ which occur due to the pads 10$y$, 13$y$, 16$y$ being held at a ground state. As described with respect to the second row of the table 290, such logic states result in the enabling/disabling circuit 252 being disabled, protecting the processor 220 from any incompatible signaling data that the legacy UHS-II host device may attempt to send or receive via the pads 11$y$, 12$y$, 14$y$, 15$y$, and further protect the legacy UHS-II host device from any signaling data the processor 220 may attempt to output via the second interface 222. As depicted connections from the pads 11$y$, 12$y$, 14$y$, 15$y$ (e.g. the further subset 242 of the second set of pads 112) are disconnected to the second interface 222 via the enabling/disabling circuit 252 (e.g. switches in the enabling/disabling circuit 252 are schematically depicted as being open). Hence, while the socket 805 may attempt to send and receive data over the pads 11$y$, 12$y$, 14$y$, 15$y$ (e.g. as indicated by the various "DATA" adjacent labels), such data is not received at the processor 220. Furthermore, as depicted, the processor 220 has retrieved the boot data 257 from the memory 256 and is attempting to boot using the boot data 257. Furthermore, as the tamper data is "0", the one or more cryptographic keys 260 are not erased.

Hence, in the configuration depicted in FIG. 8, the device 101 functions as a legacy SD memory card and stores data received over the SDIO interface 221 in the memory 256 without, however UHS-II functionality. However, neither is any damage caused to the UHS-II socket 805 by signaling over the second interface 222 as the second interface 222 is disabled.

Indeed, use of the pads 10$y$, 13$y$, which are grounded at the interface 805, to receive data at the connections 230, 233 to determine a reset mode and a boot mode of the device 101 ensures that damage does not occur to the legacy SD host device having the socket 805. For example, if the connections 230, 233 were connected to other non-grounded pads of the second set pads 112, the device 101 could damage the legacy SD host device by attempting to read the data determine a reset mode and a boot mode of the device 101 (e.g. whether or not to enable or disable the second interface 252) on the data connections of the socket 805 prior to the second interface 252 being disabled. Indeed, when the device 101 is to be used with a legacy SD host device having the depicted configuration of the socket 805, only the subset 242 of the second set of pads 112 that comprises pads that are designated as ground pads of a legacy SD host device may be used to receive enable data, boot mode data, and the like.

Figure 9:
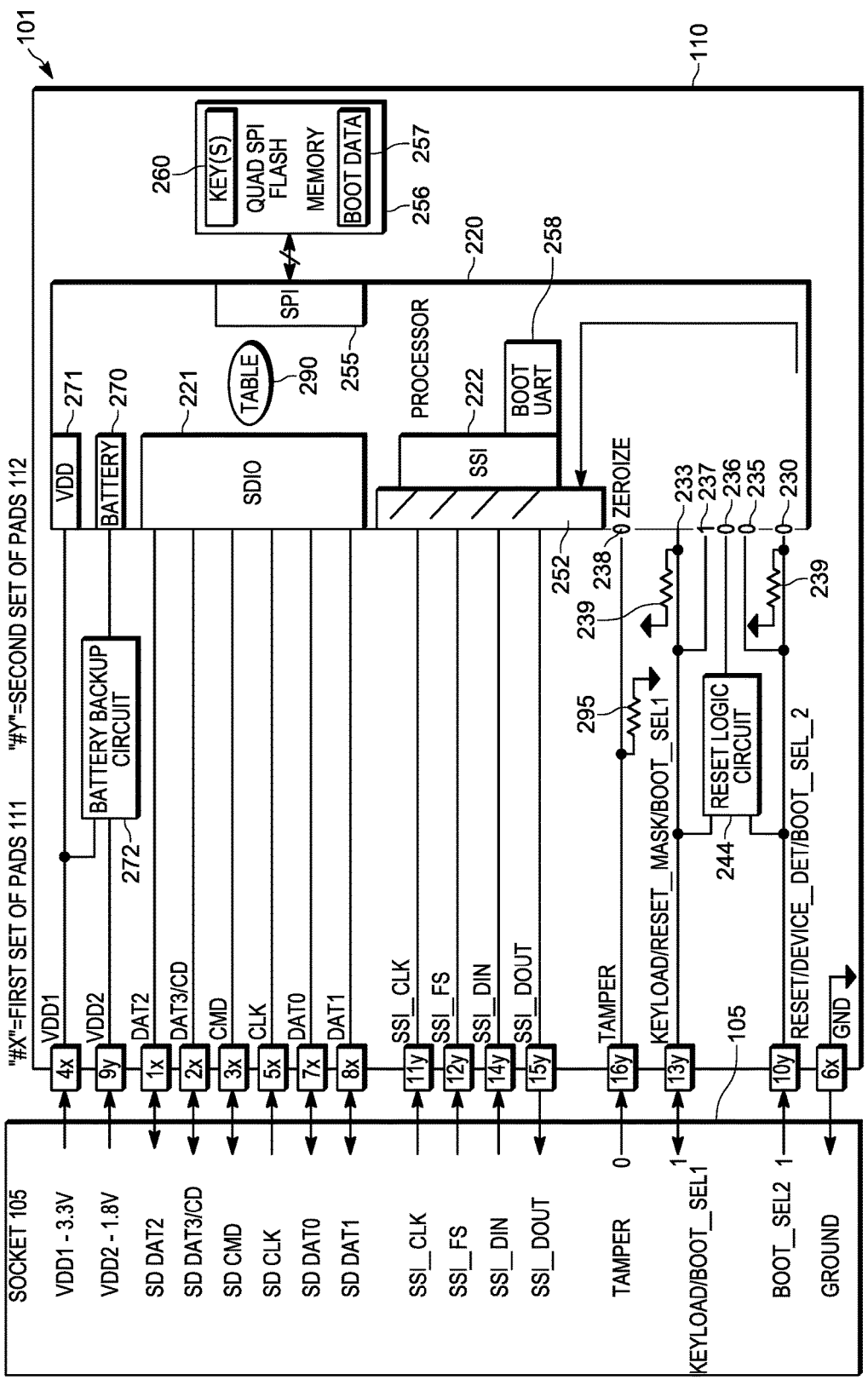
FIG. 9 depicts the secure digital format card in use with a socket of the present host device in mode where the secure digital format card is held in reset in accordance with some embodiments.

Attention is next directed to FIG. 9 which schematically depicts the device 101 interfacing with the socket 105 the host device 103. The functionality of each the connections and/or pins of the socket 105 to the respective pads 111, 112 are indicated adjacent each of the pads 111, 112. The provided arrows further indicate a direction of data/power flow, similar to FIG. 7 and FIG. 8. In particular, power of 3.3 Volts is provided at the pad 4$x$, and power of 1.8 V is provided at the pad 9$y$. Hence, the battery backup circuit 272 is generally compatible with both 3.3 V and 1.8 V. The pads 10$y$, 13$y$, 16$y$ are all now in communication with the second processor 622 of the host device 103. Assuming, in FIG. 9, that the host device 103 is operating according to the mode of the third row of the table 290, the logic states output to the pads 10$y$, 13$y$ are "0" and "1", respectively. It is further assumed in FIG. 9 that the tamper data is "0".

Hence, also depicted in FIG. 9 are the resulting detected logic states and/or enable data and/or boot data and/or tamper data at the connections 230, 235, 236, 237, 238 (respectively "0", "0", "0", "1", "0") via the pads 10$y$, 13$y$, 16$y$. As described with respect to the third row of the table 290, such logic states result in the enabling/disabling circuit 252 being disabled, protecting the second interface 222 and the processor 220 from any incompatible signaling data that the host device 103 may attempt to send or receive via the pads 11$y$, 12$y$, 14$y$, 15$y$, and further protect the host device 103 from any signaling data the processor 220 may attempt to output via the second interface 222: as depicted connections from the pads 11$y$, 12$y$, 14$y$, 15$y$ (e.g. the further subset 242 of the second set of pads 112) are disconnected to the second interface 222 via the enabling/disabling circuit 252 (e.g. switches in the enabling/disabling circuit 252 are schematically depicted as open). Hence, while the socket 105 may attempt to send and receive data over the pads' 11$y$, 12$y$, 14$y$, 15$y$, such data is not received at the processor 220. Furthermore, as depicted, the processor 220 has not retrieved the boot data 257 from the memory 256 and remains in reset. Furthermore, as the tamper data is "0", the one or more cryptographic keys 260 are not erased.

Figure 10:
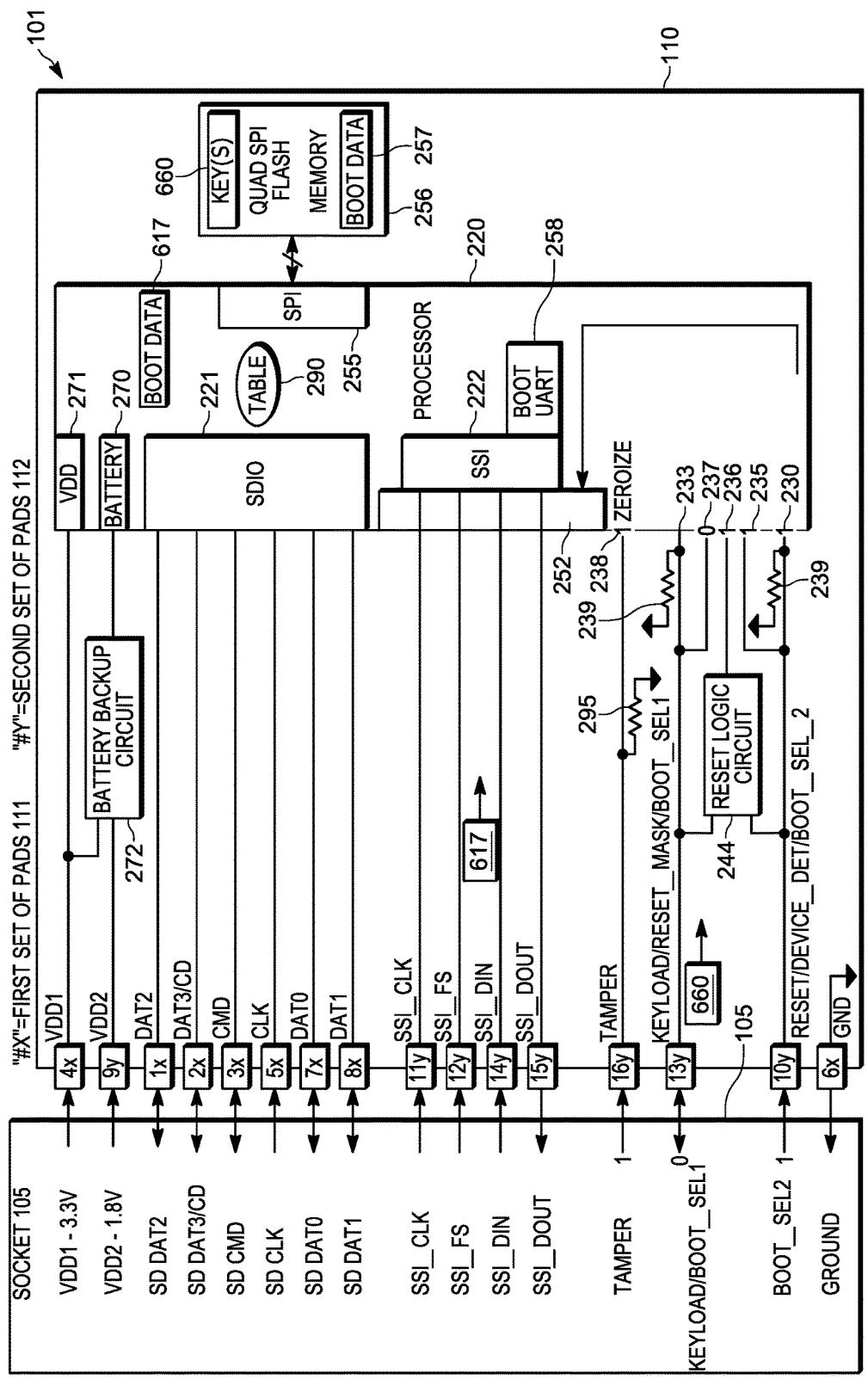
FIG. 10 depicts the secure digital format card in use with a socket of the present host device in mode where the secure digital format card is out of reset in accordance with some embodiments.

Attention is next directed to FIG. 10 which depicts the device 101 interfacing with the socket 105 the host device 103. FIG. 10 is similar to FIG. 9, however in FIG. 10 the host device 103 is operating according to the mode of the fourth row of the table 290, the logic states output to the pads 10$y$, 13$y$ are "1" and "0", respectively. It is further assumed in FIG. 10 that the tamper data is "1".

Hence, also depicted in FIG. 10 are the resulting detected logic states and/or enable data and/or boot data and/or tamper data at the connections 230, 235, 236, 237, 238 (respectively "1", "1", "1", "0", "1") via the pads 10$y$, 13$y$, 16$y$. As described with respect to the fourth row of the table 290, such logic states result in the enabling/disabling circuit 252 being enabled such that the processor 220 can communicate with both the processor 220, via the SDIO interface 221, and with the processor 220, via the second interface 222: as depicted connections from the pads 11$y$, 12$y$, 14$y$, 15$y$ (e.g. the further subset 242 of the second set of pads 112) are connected to the second interface 222 via the enabling/disabling circuit 252 (e.g. switches in the enabling/disabling circuit 252 are schematically depicted as closed). Furthermore, as depicted, the processor 220 has received the boot data 617 from the host device 103, e.g. via the pad 14$y$, and is booting from the boot data 617. Furthermore, as the tamper data is "1", the one or more cryptographic keys 260 have been erased and replaced with the one or more cryptographic keys 660 received from the host device 103, for example via the pad 13$y$ (after the logic state "0" has been detected).

Provided herein is an SD card-type device which includes a processor with two interfaces: an SD interface and a second interface, such as a serial interface. The second interface may be enabled or disabled based on logic states read by the processor over further connections to an external host device. Such enabling/disabling of the second interface generally protects the SD card-type device against damage when inserted into legacy devices that are incompatible with the second interface. Similarly, such enabling/disabling of the second interface generally protects legacy devices against damage from the SD card-type device. The logic states may further be used to determine when to place the processor into reset or out-of-reset, and furthermore how to boot the processor.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A secure digital format card device comprising:
   a housing having a secure digital (SD) card format insertable into a socket of a host device;
   a processor within the housing;
   a secure digital input/output (SDIO) interface to the processor;
   a second interface to the processor, the second interface of a different type than the SDIO interface;
   one or more further connections to the processor, the one or more further connections different from the SDIO interface and the second interface;
   a first set of pads at the housing, a subset of the first set of pads for communicating with the processor via the SDIO interface; and
   a second set of pads at the housing, a subset of the second set of pads for communicating with the processor via the second interface, and a further subset of the second set of pads for communicating with the processor via the one or more further connections,
   the processor configured to: when the housing is inserted into the socket of the host device, enable the subset of the second set of pads to communicate with the processor via the second interface when enable data is received from the host device via the one or more further connections, from the further subset of the second set of pads.

2. The secure digital format card device of claim 1, wherein the processor is further configured to refrain from enabling the subset of the second set of pads to communicate with the processor via the second interface when disable data is received via the one or more further connections, from the further subset of the second set of pads.

3. The secure digital format card device of claim 1, wherein the first set of pads and the second set of pads are arranged in a UHS-II (ultra-high-speed-II) SD-format.

4. The secure digital format card device of claim 1, wherein the further subset of the second set of pads comprises pads that are designated as ground pads according to a UHS-II (ultra-high-speed-II) SD-format.

5. The secure digital format card device of claim 4, wherein the pads of the further subset of the second set of pads, that are designated as ground pads according to a UHS-II SD-format, are electrically coupled to pull-up resistors to enable a non-standard external SD host to determine that the device is a non-standard SD device.

6. The secure digital format card device of claim 1, further comprising a memory storing data for booting the processor, and the processor is further configured to: receive boot mode data via the one or more further connections, from the further subset of the second set of pads; when the boot mode data indicates a memory boot, boot from the data stored in the memory; and, when the boot mode data indicates a download boot, boot from boot data received over the second interface.

7. The secure digital format card device of claim 1, further comprising a memory storing data for booting the processor, and the processor is further configured to: receive boot mode data via the one or more further connections, from the further subset of the second set of pads; when the boot mode data indicates a memory boot, boot from the data stored in the memory; and, when the boot mode data indicates that no boot is to occur, refrain from booting.

8. The secure digital format card device of claim 1, further comprising: a memory storing data for booting the processor; and a reset logic circuit in communication with the further subset of the second set of pads, the reset logic circuit configured to provide a boot signal to the processor based on boot mode data received over the further subset of the second set of pads.

9. The secure digital format card device of claim 1, wherein the processor is powered from power received over at least one pad from the first set of pads and the second set of pads.

10. The secure digital format card device of claim 1, further comprising a battery, the battery charged from power received over at least one pad from the first set of pads and the second set of pads.

11. The secure digital format card device of claim 10, further comprising a battery backup circuit, the battery charged from power received over the at least one pad from the first set of pads and the second set of pads, via the battery backup circuit.

12. The secure digital format card device of claim 1, further comprising a memory storing one or more cryptographic keys, one pad of the further subset of the second set of pads, for receiving tamper data indicative of whether to erase or not erase the one or more cryptographic keys, the processor further configured to: erase the one or more cryptographic keys when the tamper data is indicative of erasing the one or more cryptographic keys.

13. The secure digital format card device of claim 1, wherein the SD card format of the housing comprises one of: an SD memory card format, a mini-SD memory card format, and a micro-SD memory card format.

14. The secure digital format card device of claim 1, wherein the second interface comprises a Synchronous Serial Interface (SSI).

15. The secure digital format card device of claim 1, wherein the second interface comprises a serial interface.

* * * * *